(12) United States Patent
Zeng et al.

(10) Patent No.: US 9,868,443 B2
(45) Date of Patent: Jan. 16, 2018

(54) REACTIVE PATH PLANNING FOR AUTONOMOUS DRIVING

(71) Applicant: GM GLOBAL TECHNOLOGY OPERATIONS LLC, Detroit, MI (US)

(72) Inventors: Shuqing Zeng, Sterling Heights, MI (US); Rouhollah Jafari, Troy, MI (US); Nikolai K. Moshchuk, Grosse Pointe, MI (US); Bakhtiar B. Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 53 days.

(21) Appl. No.: 14/696,877

(22) Filed: Apr. 27, 2015

(65) Prior Publication Data

US 2016/0313133 A1 Oct. 27, 2016

(51) Int. Cl.
*B60W 30/18* (2012.01)
*B62D 15/02* (2006.01)
*G08G 1/16* (2006.01)

(52) U.S. Cl.
CPC ... *B60W 30/18163* (2013.01); *B62D 15/0255* (2013.01); *B62D 15/0265* (2013.01); *G08G 1/163* (2013.01); *G08G 1/167* (2013.01)

(58) Field of Classification Search
CPC ..... G01C 21/34; B60W 30/09; B60W 30/095; B60W 30/10; B60W 30/12; B60W 30/14; B60W 30/16; B60W 30/18163; G05D 1/0088; G05D 1/0274; G08G 1/165; G08G 1/166; G08G 1/163; G08G 1/167; B62C 15/0265; B62C 15/0255
See application file for complete search history.

(56) References Cited

U.S. PATENT DOCUMENTS

| 8,392,117 B2 | 3/2013 | Dolgov et al. |
| 9,174,672 B2 * | 11/2015 | Zeng ...................... G05D 1/024 |
| 9,199,668 B2 * | 12/2015 | Zeng .................. B62D 15/0265 |

(Continued)

OTHER PUBLICATIONS

Rong Zhu et all, Collision-free Path Planning and Trajectory Generation for MAVs Flying in Urban Terrain, Proceedings of the 2006 IEEE/RSJ International Conference on Intelligent Robots and Systems Oct. 9-15, 2006.*

(Continued)

*Primary Examiner* — Abby Y Lin
(74) *Attorney, Agent, or Firm* — Quinn IP Law

(57) ABSTRACT

A method of adaptively re-generating a planned path for an autonomous driving maneuver. An object map is generated based on the sensed objects in a road of travel. A timer re-set and actuated. A planned path is generated for autonomously maneuvering the vehicle around the sensed objects. The vehicle is autonomously maneuvered along the planned path. The object map is updated based on sensed data from the vehicle-based devices. A safety check is performed for determining whether the planned path is feasible based on the updated object map. The planned path is re-generated in response to a determination that the existing path is infeasible, otherwise a determination is made as to whether the timer has expired. If the timer has not expired, then a safety check is re-performed; otherwise, a return is made to re-plan the path.

14 Claims, 6 Drawing Sheets

(56) References Cited

U.S. PATENT DOCUMENTS

| | | | |
|---|---|---|---|
| 2003/0030398 A1* | 2/2003 | Jacobs | G05D 1/0274 |
| | | | 318/568.12 |
| 2005/0222764 A1* | 10/2005 | Uyeki | G01C 21/3415 |
| | | | 701/414 |
| 2009/0088916 A1 | 4/2009 | Elgersma et al. | |
| 2010/0228427 A1 | 9/2010 | Anderson et al. | |
| 2011/0153137 A1* | 6/2011 | Yeom | G05D 1/0274 |
| | | | 701/25 |
| 2016/0129592 A1* | 5/2016 | Saboo | B25J 9/1661 |
| | | | 700/248 |

OTHER PUBLICATIONS

Zu Kim, Realtime Obstacle Detection and Tracking Based on Constrained Delaunay Triangulation, 2006 IEEE Proceedings, Intelligent Transportation Systems Conference.*

* cited by examiner

REACTIVE PATH PLANNING FOR AUTONOMOUS DRIVING

BACKGROUND OF INVENTION

An embodiment relates to autonomous path planning.

Path planning is required for autonomous and semi-autonomous highway driving and for advanced driver assistance systems such as collision avoidance. Path planning must be reactive to changes in a host vehicle dynamics and other static and dynamic objects on the road. The planned path must result in a safe collision free path within the road boundaries which must also be feasible for the host vehicle control in light of the vehicle dynamic constraints such as maximum lateral acceleration/jerk. Known path planning techniques do not consider either the dynamics of the host vehicle and other moving target vehicles or are too computationally intensive for real-time applications to be reactive in appropriate time.

SUMMARY OF INVENTION

An advantage of an embodiment is a fast path planning technique for autonomous driving maneuver that is reactive to dynamics of a host vehicle and other moving vehicles as well as stationary objects surrounding the host vehicle. The technique utilizes a Delaunay Triangulation process to identified segments for generating the planned path. The identified segments are selected based on a cost-distance function which takes into account various factors including a shortest length, offset from a previous planned path, offset from a center of a lane, slope of each selected segment relative to adjacent segments, and distance from other vehicles and targets. In addition, the routine refines the planned path by identifying a corridor offset from the planned path and identifying a smoothed path within the corridor. The technique further determines the feasibility of the re-planned path by identifying lateral accelerations of the vehicle and distance from other dynamic vehicle. Moreover, the technique will re-determine a planned path after a predetermined period of time; however, the technique will continuously check a safety of the existing path during the predetermined period of time. As a result, the technique described herein reduces the amount of time that is needed to regenerate a planned path by only regenerating a planned path at timed intervals or when the existing path is no longer feasible; however, checks are constantly performed in between the timed intervals to verify whether the planned path remains feasible.

An embodiment contemplates a method of adaptively re-generating a planned path for an autonomous driving maneuver comprising the steps of (a) obtaining, by vehicle-based devices, object data associated with sensed objects in a road of travel; (b) constructing, by a processor, an object map based on the sensed objects in a road of travel; (c) re-setting and actuating a timer; (d) generating, by the processor, a planned path for autonomously maneuvering the vehicle around the sensed objects, the planned path being generated based on a cost-distance function; (e) autonomously maneuvering the vehicle along the planned path; (f) updating the object map based on updated sensed data from the vehicle-based devices; (g) determining whether the planned path is feasible based on the updated object map; (h) returning to step (a) in response to a determination that the planned path is infeasible; otherwise continuing to step (i); (i) determining whether the timer has expired; and (j) returning to step (a) in response to the timer expiring; otherwise, returning to step (f).

DETAILED DESCRIPTION

Figure 1:
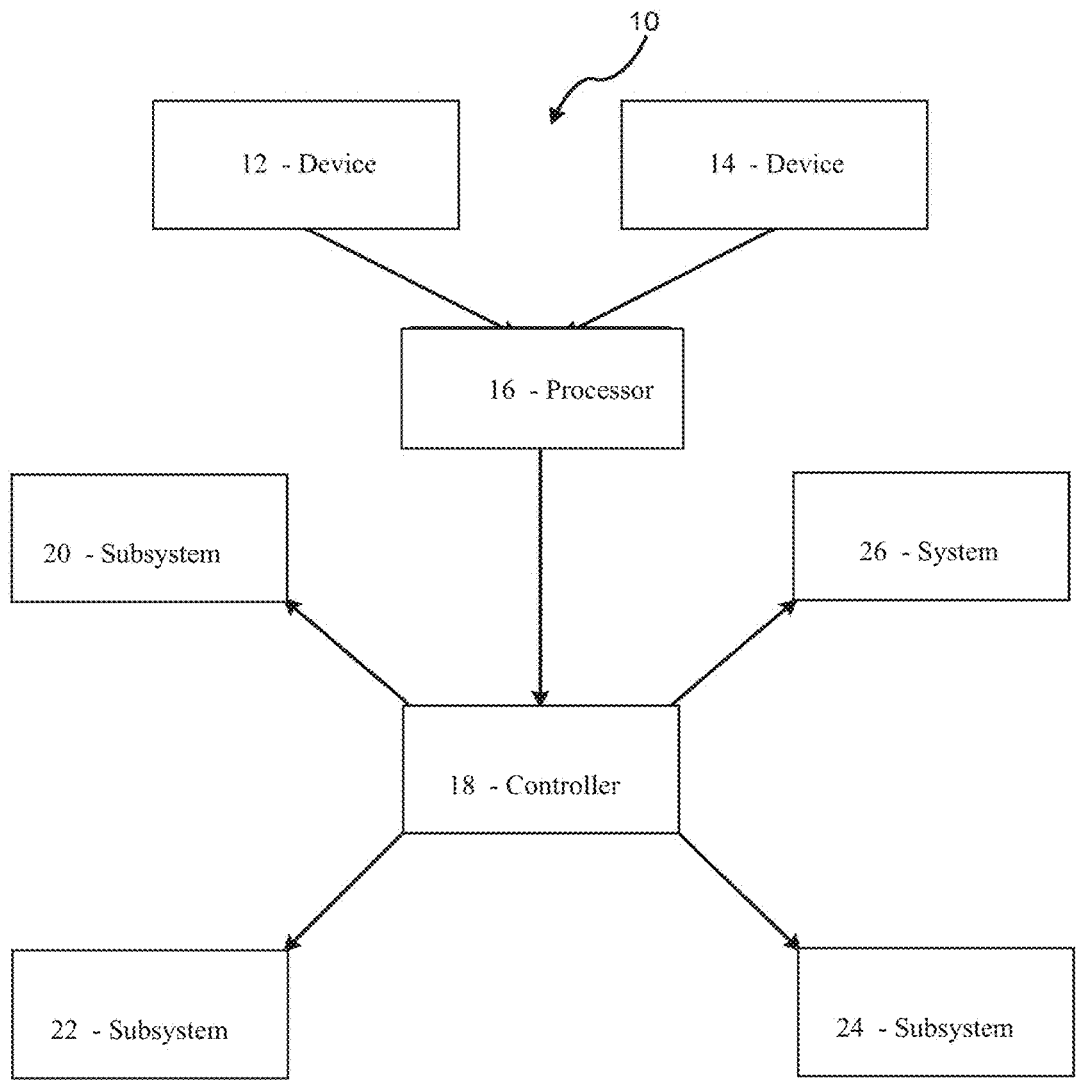
FIG. 1 is a block diagram of a path planning system.

FIG. 1 illustrates a block diagram of a path planning system 10 for a vehicle. The vehicle (hereinafter referred to as the host vehicle) includes a vehicle-based image capture device 12 and at least one sensing-based device 14.

The image capture device 12 captures images exterior of the vehicle. The images captured by the image capture device 12 are analyzed for detecting lanes of travel of the road represented by lane markings.

The sensing-based device 14 may include, but is not limited to, radar-based devices, lidar-based devices, and ultrasonic-based devices for sensing objects both stationary and moving objects surrounding the vehicle.

A processor 16 processes the image data captured by the image capture device 12 and the sensed data sense by the sensing device 14. The processor 16 analyzes the respective data and identifies objects in the road of travel for determining a planned path for generating a planned path maneuver.

The processor 16 may be coupled to one or more controllers 18 for initiating or actuating a control action for generating the planned path maneuver. One or more vehicle subsystems may be actuated and controlled for performing the planned path maneuver. The respective vehicle subsystems that may be controlled for performing the planned path maneuver include, but are not limited to, a steering control subsystem 20, a speed control subsystem 22, and a braking control subsystem 24. A communication system 26 may also be utilized for communicating a planned path to detected target vehicles using vehicle-vehicle communications for making the detected target vehicles aware of the plan path maneuver.

The steering subsystem 20 may be controlled for actuating a steering maneuver for steering the vehicle around a detected target in the host vehicles lane of travel.

The braking subsystem 24 may enable an electrical, electro-hydraulic or hydraulic braking system where a braking strategy is readied in the event that an autonomous light braking force is required by the vehicle when performing the lane change maneuver.

Speed control subsystem 22 may control the speed of the vehicle for either accelerating or decelerating the vehicle during a lane change maneuver.

Figure 2:
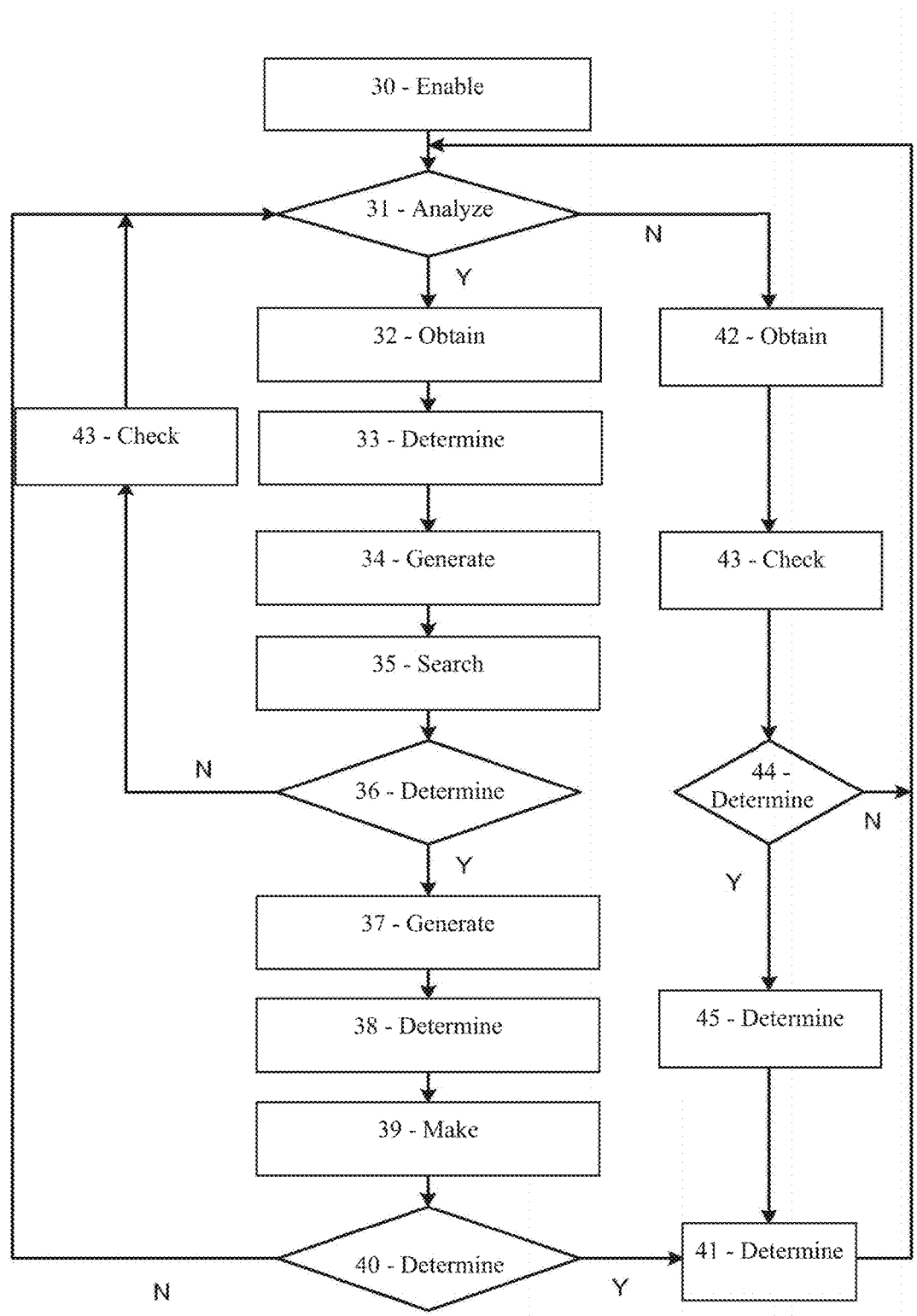
FIG. 2 is a flowchart of a reactive path planning technique.

FIG. 2 illustrates a flowchart for a Reactive Path Planning (RPP) technique. The RPP technique is preferably utilized for autonomous driving on highway roads. The RPP technique uses lane data detected from the image-base capture device and sensing device from the sensor-based device and fuses the data into an object map for generating the host vehicle's path waypoints for a short distance ahead. The processor may include a prediction-based processor that can be used to track the generated path for the host vehicle. The RPP technique ensures that first and foremost, the generated path is at a safe distance from detected surrounding objects such as other moving target vehicles and stationary objects (e.g., construction barrels). Secondly, the RPP technique ensures that the path is a feasible path that can be tracked while taken into consideration the dynamic constraints of the host vehicle. Lastly, the RPP technique ensures that the host vehicle remains on the road during the lane change maneuver.

The RPP technique described herein is referred to as reactive since the host vehicle path is regenerated after a short period of time (e.g., 0.5 sec) based on the new sensor data even before an end point of a previously determined path is reached. Therefore, the RPP technique is reactive to any changes in the lane data or object map data.

In step 30, the routine is enabled and the routine proceeds to step 31. In step 31, criteria is analyzed for identifying whether to generate a new planned path or continue analyzing the current planned path. It should be understood that the RPP technique is a repetitive in that the planned path is constantly analyzed and revised based on the surrounding environment. Therefore, decisions in step 31 are the results of conditions that are constantly analyzed throughout the RPP routine. The following conditions are used for determining whether a new planned path should be generated or whether the routine should continue monitoring the existing path. The conditions include, but are not limited to (1) identifying whether an existing planning time ($T_{plan}$) is expired; (2) determining whether the previous host vehicle path is not safe; (3) determining whether the previous host vehicle path is not feasible; (4) determining whether an offset from the host vehicle path is greater than a predetermined offset threshold. If any of the conditions are present, then the routine proceeds to step 32 for generating a next planned path; otherwise, the routine proceeds to step 42 to continue analyzing the existing planned path.

Figure 3:
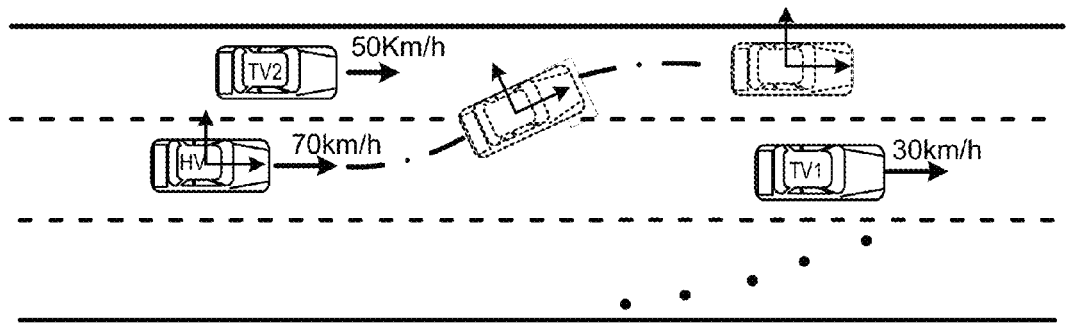
FIG. 3 is an exemplary planned path.

In step 32, object map data and lane data are obtained. FIG. 3 illustrates an exemplary scenario for the RPP technique where the host vehicle path has been generated at three different instants. Each of the instants at which the vehicle planned path has been generated is referred to as planning times. The main inputs for the RPP technique are the object map and the lane data. The object map is derived from the object map data inputs that include a list of detected targets and their corresponding scan points as identified by the following representation:

$$(ID_i^t, X_i^t, Y_i^t, \theta_i^t, V_i^t):[(x_{i1}^s, y_{i1}^s),(x_{i2}^s, y_{i2}^s), \ldots ,(x_{im_i}^s, y_{im_i}^s)], \quad (1)$$

for i=1, 2, . . . , n
where n is the number of detected targets, $ID_i^t$ is a unique index number of an i-th target, $(X_i^t, Y_i^t)$ is the median point of the i-th target transformed to the global frame, $\theta_i^t$ and $V_i^t$ represent a heading angle and velocity of the i-th target, respectively, $(x_{ij}^s, y_{ij}^s)$ represents a j-th scan point of the i-th target in a global frame, and $m_i$ is a number of scan points corresponding to the i-th target.

The lane data is in the form of the coefficients of two cubic polynomials representing left and right lane markings. The representations are as follows:

$$y_L = a_{0L} + a_{1L}x + a_{2L}x^2 + a_{3L}x^3$$

$$y_R = a_{0R} + a_{1R}x + a_{2R}x^2 + a_{3R}x^3 \quad (2)$$

where $y_L$ and $y_R$ represent the left and the right lane markings in a host vehicle frame, respectively.

The lane data also includes parameters determining the quality of vision sensor readings and the type of lane markings such as solid or dashed lines.

The RPP technique further utilizes other host vehicle data such as a vehicle's position $(X_h, Y_h)$ in the global frame, a heading angle $\theta_h$, a velocity $V_h$, a yaw rate $\omega_h$, and longitudinal and lateral accelerations, $a_h$ and $a_{hL}$.

The host vehicle frame is referred to a frame attached to a center of gravity of the host vehicle with an x-axis heading toward a front of the vehicle. A global frame is identical to the host vehicle frame at every planning instance of time. This indicates that the global frame is transformed to the current host vehicle frame whenever a new path is generated. This also indicates that the current host vehicle frame is fixed on the ground between planning times.

Targets that are detected far from the current host vehicle position which have no effects on the path planning should be ignored. As a result, a virtual window is formed around the host vehicle with all the targets identified in eq. (1) as having an impact on the planned path. The window is represented as follows:

$$X_h - \frac{L_{win}}{2} \leq X_i^t \leq X_h + L_{win} \quad (3)$$

$$Y_h + W_{win} \leq Y_i^t \leq Y_h + W_{win}$$

where $L_{win}$ and $W_{win}$ represent the window around the vehicle, 1.5 $L_{win}$ is the length and 2 $W_{win}$ is the width of such window, where a respective planned path is calculated therein. The scan points for each target are also simplified using Douglas-Peucker method to reduce the computational cost.

If the quality of the camera readings have insufficient resolution, then the following default values of a straight lane for a left lane markings and right lane markings are represented as follows:

$$a_{0L} = 1.75, a_{1L} = a_{2L} = a_{3L} = 0$$

$$a_{0R} = -1.75, a_{1R} = a_{2R} = a_{3R} = 0. \quad (4)$$

where the units of the lane coefficients are such that Eq. (2) results in meters.

In step 33, a safe space for the host vehicle maneuver is determined by adding virtual nodes created utilizing the Delaunay Triangulation technique. The Delaunay Triangulation technique uses a combination of triangles in the space between scan points, adjacent lanes, and the host vehicle. Delaunay triangulation technique takes a portion of the virtual nodes as inputs and creates triangles to represent the convex space defined by those nodes. For the RPP technique described herein, the input nodes utilized in the Delaunay triangulation are defined as lane virtual nodes, host vehicle virtual nodes, ending virtual nodes, and shifted scan nodes.

Lane virtual nodes are generated on the lane boundaries of the road to ensure that the host vehicle path is on the road.

The lane virtual nodes are located at equal distances from each other along the lane boundaries and are calculated as follows:

$$x_k^L = kL_h \quad (5)$$

$$y_k^L = \begin{cases} a_{0L} + a_{1L}x_k^L + a_{2L}(x_k^L)^2 + a_{3L}(x_k^L)^3 & \text{if } T_L = 1 \\ a_{0L} + a_{1L}x_k^L + a_{2L}(x_k^L)^2 + a_{3L}(x_k^L)^3 + W_{lane} & \text{Otherwise} \end{cases}$$

$$x_k^R = kL_h$$

$$y_k^R = \begin{cases} a_{0R} + a_{1R}x_k^R + a_{2R}(x_k^R)^2 + a_{3R}(x_k^R)^3 & \text{if } T_R = 1 \\ a_{0R} + a_{1R}x_k^R + a_{2R}(x_k^R)^2 + a_{3R}(x_k^R)^3 + W_{lane} & \text{Otherwise} \end{cases}$$

$$\text{for } k = 1, 2, \ldots, \text{ceil}(L_{win}/L_h)$$

where $(x_k^L, y_k^L)$ and $(x_k^R, y_k^R)$ represent the virtual nodes in the host vehicle frame along the left and right lane boundaries, respectively, $L_h$ is a length of the host vehicle taken as the longitudinal distance between virtual nodes, $W_{lane}$ is a width of a current lane and Boolean variables $T_L$ and $T_R$ are true if the left and right lane markings are solid thereby implying that there is no adjacent lane on that side.

It should be understood that the nodes in Eq. (5) require transformation to a global frame in order to be used by the Delaunay Triangulation technique.

Host vehicle virtual nodes include two virtual nodes with equilateral distances from a current position of the host vehicle. This defines a start of the search space and is represented by the following parameters:

$$X_{1,2}^h = X_h$$

$$Y_{1,2}^h = Y_h \pm 1 \quad (6)$$

End virtual nodes define the end of the search space and are represented as follows:

$$x_{1,2}^e = \max_k x_k^L + L_h, x_{3,4}^e = \max_k x_k^R + L_h$$

$$y_1^e = y_{max(k)}^L, y_2^e = y_{max(k)}^L - W_{lane}$$

$$y_3^e = y_{max(k)}^R, y_4^e = y_{max(k)}^R + W_{lane}. \quad (7)$$

The nodes in eq. (7) are in the host vehicle frame and require transformation into the global frame. If the left and/or right lane markings are solid, then the virtual nodes $(x_2^e, y_2^e)$ and/or $(x_4^e, y_4^e)$ are ignored, respectively, or are ignored if no target is detected inside the planning window.

Shifted scan node points are nodes which are shifted based on relative velocities of each of the detected target vehicles. The scan points in eq. (1) are shifted along the road as determined by the following equations:

$$\bar{x}_{ij}^s = x_{ij}^s + V_i^t \cos(\theta_i^t) T_i^r \quad (8)$$

$$\bar{y}_{ij}^s = y_{ij}^s + \frac{a_{1R} + a_{1L}}{2}(\bar{x}_{ij}^s - x_{ij}^s) + \frac{a_{2R} + a_{2L}}{2}((\bar{x}_{ij}^s)^2 - (x_{ij}^s)^2) + \frac{a_{3R} + a_{3L}}{2}((\bar{x}_{ij}^s)^3 - (x_{ij}^s)^3)$$

where $T_i^r$ is a variable representing the amount of time the host vehicle needs to reach the i-th target. $T_i^r$ is calculated as follows:

$$T_i^r = \begin{cases} 0 & \text{if } |X_h - X_i^t| < D_{min} \\ \dfrac{X_h - X_i^t}{V_i^t \cos(\theta_i^t) - V_h \cos(\theta_h)} & \text{elseif } |V_i^t \cos(\theta_i^t) - V_h \cos(\theta_h)| > V_{min} \\ -1 & \text{otherwise} \end{cases} \quad (9)$$

where $D_{min}$ and $V_{min}$ are the constant parameters denoting distance and velocity thresholds for shifting the scan points. Those shifted scan points will be considered in the triangulation calculation if the following three conditions are satisfied:

$$T_i^r \geq 0, \; X_h \leq \bar{x}_{ij}^s \leq X_h + L_{win}, \quad (10)$$

$$Y_{Rmin} \leq \bar{y}_{ij}^s \leq Y_{Lmax}$$

where $$Y_{Rmin} = a_{0R} + a_{1R}\bar{x}_{ij}^s + a_{2R}(\bar{x}_{ij}^s)^2 + a_{3R}(\bar{x}_{ij}^s)^3 - W_R \quad (11)$$

$$Y_{Lmax} = a_{0L} + a_{1L}\bar{x}_{ij}^s + a_{2L}(\bar{x}_{ij}^s)^2 + a_{3L}(\bar{x}_{ij}^s)^3 - W_L$$

and $$W_R = \begin{cases} W_{lane} & \text{if } T_R = 0 \; \& \; n \neq 0 \\ 0 & \text{otherwise} \end{cases} \quad (12)$$

Figure 4:
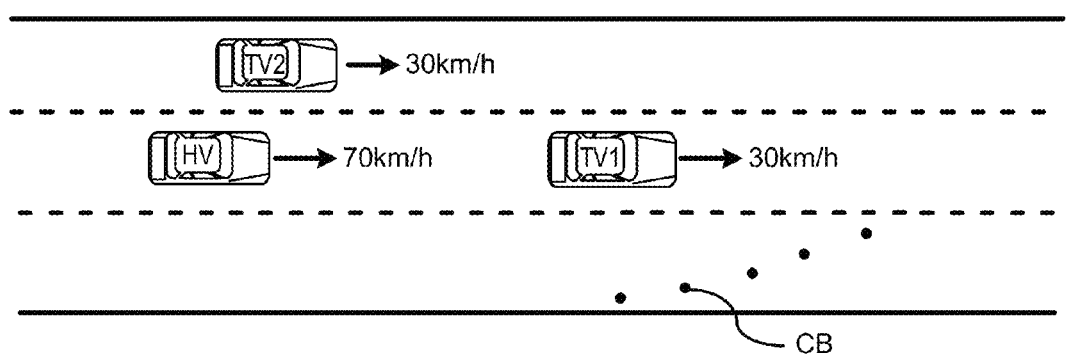
FIG. 4 is an exemplary driving scenario involving obstacles.

FIG. 4 represents an exemplary scenario which includes two slow-moving target vehicles moving in a same direction as host vehicle. A target vehicle (TV2) to the left of the host vehicle (HV) is traveling at approximately 30 km/h, and a target vehicle (TV1) in a front of the host vehicle is travel at approximately 30 km/h. Several constructions barrels (CB) are located in the right lane relative to the host vehicle.

Figure 5:
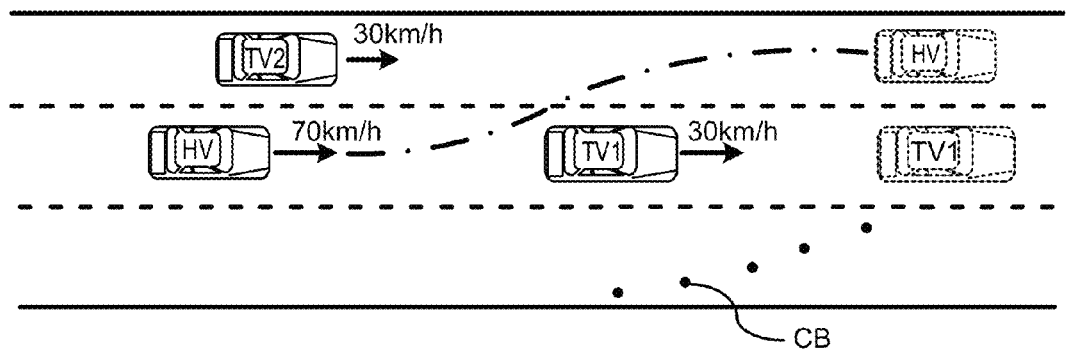
FIG. 5 is an exemplary scenario of virtual scan nodes.

FIG. 5 shows an example of how the scan points corresponding to the TV1 are shifted to forecast a position of the vehicle over time relative to the host vehicle based on a velocity of the TV1. It is noted that since TV2 is positioned too close to the HV, then TV2 is not shifted. This represented by the first condition in eq. (9).

Figure 6:
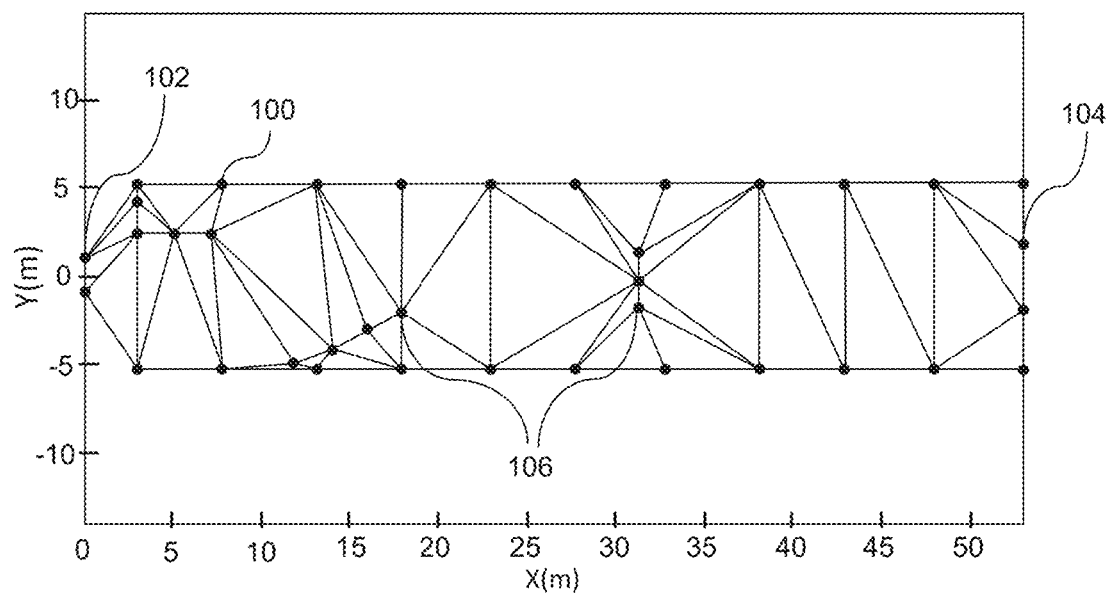
FIG. 6 is an exemplary presentation of the Delaunay Triangulation for the scanned virtual nodes.

The Delaunay Triangulation representation of the exemplary scenario in FIG. 4 is shown in FIG. 6, which includes the lane virtual nodes 100, the host vehicle virtual nodes 102, the ending virtual nodes 104, and shifted scan points 106. The shifting of the scan points is takes into consideration a target vehicles dynamics so that a safe path can be determined for the host vehicle. This also has the advantage of making the determined path closer to a driver selected path.

In step 34, a search graph is generated. A search graph is a graph defined in triangulation space and is composed of a number of vertices and segments connecting associated vertices. Vertices are generated and located on specific triangle edges that satisfy the following conditions: (1) each edge is not an edge on the boundary; (2) each edge is not connecting two scan points from the same target; (3) each edge is not connecting two lane virtual nodes; (4) each edge length has a length is greater than a threshold value ($L_{min}$); (5) each edge connects two ending virtual nodes; and (6) each edge is inside the convex polygon defined by the lane virtual nodes.

Figure 7:
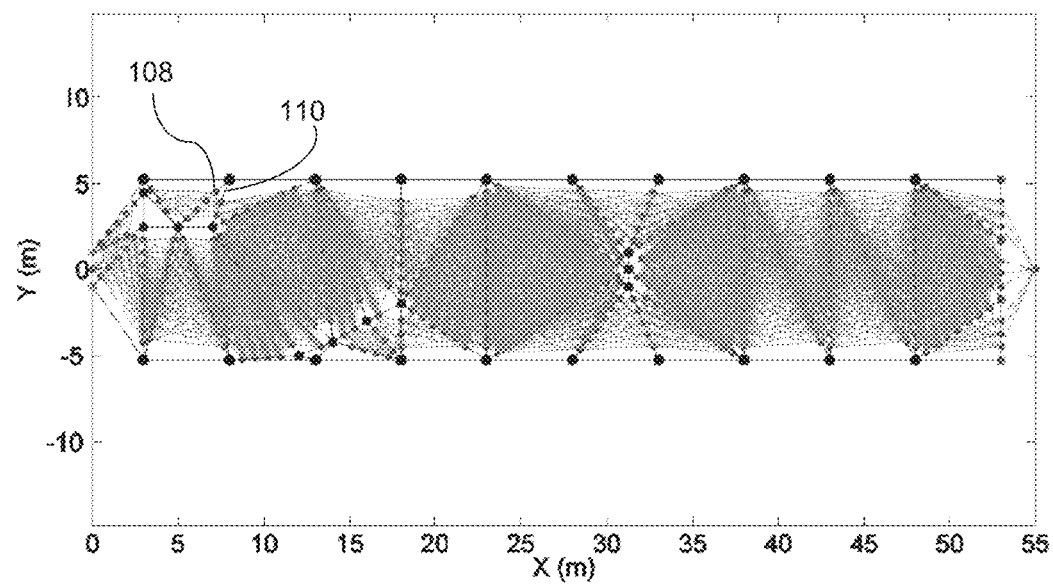
FIG. 7 is an exemplary plot displaying vertex points.

If a triangle edge satisfies each of the above conditions, vertex points 108 are defined along that edge as shown in FIG. 7. Vertex points 108 are positioned along each edge equidistance from one another and are equally spaced between a respective pair of scan nodes or between a scan node and a lane virtual node. The following set of equations is used to solve for vertex points:

$$\begin{cases} (x_{ij}^v - x_i^{sr})^2 + (y_{ij}^v - y_i^{sr})^2 = jd_v \\ y_{ij}^v = y_i^{sr} + \left(\frac{y_i^{tg} - y_i^{sr}}{x_i^{tg} - x_i^{sr}}\right)(x_{ij}^v - x_i^{sr}) \end{cases} \quad (13)$$

for $i = 1, 2, \ldots, n_e$, $j = 1, 2, \ldots, \text{floor}\left(\frac{L_i^e}{d_v}\right) - 1$ where $(x_{ij}^v, y_{ij}^v)$ denotes the j-th vertex on the i-th edge, $(x_i^{sr}, y_i^{sr})$ and $(x_i^{tg}, y_i^{tg})$ represents the source node and the target node for the i-th edge, x respectively, $d_v$ is the constant distance between the vertices along the edge, $n_e$ is the number of edges satisfying conditions above, and $L_i^e$ is the length of the i-th edge.

If the i-th edge is vertical in the global frame (i.e., $x_i^{tg} \approx x_i^{sr}$), then the following formula is used to find the vertices:

$$\begin{cases} x_{ij}^v = x_i^{sr} \\ y_{ij}^v = y_i^{sr} + \text{sgn}(y_i^{tg} - y_i^{sr}) jd_v \end{cases}, \text{ for } j = 1, 2, \ldots, \text{floor}\left(\frac{L_i^e}{d_v}\right) - 1. \quad (14)$$

In addition to the vertices obtained in eq. (13) & (14), a source vertex is added at the current host vehicle position. In addition, a target vertex is added with its X-coordinate value greater than the maximum X value of the other vertices and Y-coordinate value as the average value of the Y-coordinates of ending virtual nodes in eq. (7). The source and target vertices are used in Dijkstra's algorithm to find the shortest path which will be discussed in detail later.

With respect to the parameter $d_v$, which is the constant distance between the vertices along an edge, has a significant role in generated the search graph. If $d_v$ is chosen small, the number of vertices in the graph will increase which results in a finer graph resolution for the space within a respective triangular regions and increases the smoothness of the final path, which in addition, is also closer to a driver-chosen path; however, having a finer resolution will require more computational power for the algorithm. Therefore, a balance is preferable when selecting the $d_v$ since this is an instrumental tuning parameter in the technique. To reduce the computational power while maintaining a reasonable level of smoothness for the selected path, two candidate values are set for $d_v$ and for each triangle edge. A respective value is selected based on a proximity of the selected edge to the host vehicle and shifted target vehicles on the road. If a triangle edge is close to the host or shifted point of the target vehicle, then a smaller value is chosen for $d_v$, otherwise larger value relative to the smaller value is selected.

Once the vertex points 108 are determined, they are connected by graph segments 110. Graph segments connect two vertices which (1) belong to the same triangle, and (2) do not belong to the same edge. The vertex points 108 and the graph segments 110 are shown plotted in FIG. 7 for the sample scenario.

In step 35, using the Dijkstra's algorithm, a search is performed to find the shortest path in the search graph which connects the source vertex to the target vertex. The shortest path is not found in terms of a conventional distance definition, but in terms of a cost-distance function defined as follows:

$$D_i = \sum_j \left( \alpha_L \frac{D_{ij}^L}{D_{max}^L} + \alpha_s \frac{D_{ij}^s}{D_{max}^s} + \alpha_d \frac{D_{ij}^d}{D_{max}^d} + \alpha_c \frac{D_{ij}^c}{D_{max}^c} + \alpha_p \frac{D_{ij}^p}{D_{max}^p} \right), \quad (15)$$

for $i = 1, 2, \ldots, n_{path}$, $j = 1, 2, \ldots, n_{seg}$ where $D_i$ is a distance for the i-th path from the source vertex to the target vertex, $D_{ij}^L$, $D_{ij}^s$, $D_{ij}^d$, $D_{ij}^c$, and $D_{ij}^p$ are distance function components of the j-th segment for the i-th path, $\alpha_L$, $\alpha_s$, $\alpha_d$ and $\alpha_p$ are constant weight coefficients, and $n_{path}$ and $n_{seg}$ are the number of paths from the source vertex to target vertex and the number of segments in each path, respectively.

The term $D_{ij}^L$ in eq. (15) corresponds to the length of the j-th segment of the i-th path. This term considers the shortest distance from a convention measurement. The equation for determining the term $D_{ij}^L$ is represented as follows:

$$D_{ij}^L = \sqrt{(x_{ij}^{vs} - x_{ij}^{vt})^2 + (y_{ij}^{vs} - y_{ij}^{vt})^2} \quad (16)$$

where $(x_{ij}^{vs}, y_{ij}^{vs})$ and $(x_{ij}^{vt}, y_{ij}^{vt})$ denote the source and target vertices of the corresponding segment, respectively.

The term $D_{ij}^L$, in eq (15) is included in the distance function so that the actual length of the path plays a role in calculating the shortest path. $D_{max}^L$, in the denominator, represents a maximum possible length of a segment and is used to normalize the length cost to [0 1] range. The weight coefficient $\alpha_L$ is a positive constant that requires tuning along with other weight coefficients to generate a practical host vehicle path for different scenarios.

The term, $D_{ij}^s$, in eq. (15) corresponds to the relative slope of the j-th segment of the i-th path to the heading of the host vehicle or the lane. The parameter considers the smooth transition of the steering maneuver such as minimizing abrupt changes/jerks in the steering maneuver. The equation for determining the term $D_{ij}^s$ is represented as follows:

$$D_{ij}^s = \begin{cases} |\theta_{ij} - \theta_h| & \text{if } \min(x_{ij}^{vs}, x_{ij}^{vt}) - X_h \le D_{HV} \\ \gamma_s |\theta_{ij} - \theta_{lane}| & \text{otherwise} \end{cases} \quad (17)$$

where $\theta_{ij}$ is the angle of the segment in the global frame, $D_{HV}$ is a positive constant representing a close distance ahead of the host vehicle, $\gamma_s \in [0\ 1]$ is a tuning parameter, and $\theta_{lane}$ is the lane heading at the segment's position. The lane heading $\theta_{lane}$ is represented as follows:

$$\theta_{lane} = \theta_h + \text{atan}(\tfrac{1}{2}[a_{1L} + a_{1R} + 2\max(x_{ij}^{vs}, x_{ij}^{vt})(a_{2L} + a_{2R}) + 3[\max(x_{ij}^{vs}, x_{ij}^{vt})]^2 (a_{3L} + a_{3R})]) \quad (18)$$

The term $D_{ij}^s$, in eq (15) is included in the distance function to ensure that the resulted shortest path is sufficiently aligned with a current host vehicle heading in a close region ahead of the vehicle and is aligned with the lane heading thereafter. The positive angle $D_{max}^s$ is employed to normalize the cost to [0 1] range, and the weight coefficient $\alpha_s$ is a tuning parameter which will affect the alignment of the shortest path to the host vehicle heading compared to other distance function components.

The term, $D_{ij}^d$, in eq. (15) is related to the distance of a segment in the search graph to the host vehicle path found at a previous planning time. This prevents any significant deviation from the previous planned path which could otherwise result in significant steering changes to the vehicle. The equation for determining the term $D_{ij}^d$ is represented as follows:

$$D_{ij}^d = D_{ij}^{ds} + D_{ij}^{dt} \quad (19)$$

where $d_{ij}^{ds}$ and $D_{ij}^{dt}$ are the weighted offsets from the previous host vehicle path for the source and target vertices of the segments with more weights directed on closer vertices to the host vehicle, specifically, $$D_{ij}^{ds} = \begin{cases} \frac{\max(n_{HV}-2k,0)}{10} |y_{ij}^{vs} - (\hat{Y}_k^{HV} + \hat{Y}_{k+1}^{HV})/2| & \text{if } \hat{X}_k^{HV} \leq x_{ij}^{vs} < \hat{X}_{k+1}^{HV} \\ 0 & \text{otherwise} \end{cases} \quad (20)$$

$$D_{ij}^{dt} = \begin{cases} \frac{\max(n_{HV}-2k,0)}{10} |y_{ij}^{vt} - (\hat{Y}_k^{HV} + \hat{Y}_{k+1}^{HV})/2| & \text{if } \hat{X}_k^{HV} \leq x_{ij}^{vt} \leq \hat{X}_{k+1}^{HV} \\ 0 & \text{otherwise} \end{cases}$$

for $k=1, 2, \ldots, n_{HV}-1$,
where $(\hat{X}_k^{HV}, \hat{Y}_k^{HV})$ denotes the k-th waypoint in the previous feasible host vehicle path and $n_{HV}$ is the number of host vehicle path waypoints.

The term $D_{ij}^d$ is included in the distance function so that a current shortest path, particularly the segment closer to the current host vehicle position is forced to be sufficiently close to the previous planned path. This assists the processor in tracking the generated host vehicle path more efficiently. As described earlier, $D_{max}^d$ is used to normalize this cost to [0 1] range and $\alpha_d$ is a tuning parameter.

The term $D_{ij}^c$ in eq. (15) is related to the distance of a segment in the search graph to the centerline of the current lane. This relates to an offset from a center of each lane. The equation for determining the term $D_{ij}^c$ is represented as follows:

$$D_{ij}^c = \min(d_{ij}^{c1}, d_{ij}^{c2}, d_{ij}^{c3}) \quad (21)$$

where $d_{ij}^{c1}$, $d_{ij}^{c2}$ and $d_{ij}^{c3}$ are the offset values of the segment from the centers of the current lane, adjacent left lane, and adjacent right lane, respectively. The offsets are represented as follows:

$$d_{ij}^{c1} = \left| y_{ij}^{vs} - \frac{y_{ij}^{sl} + y_{ij}^{sr}}{2} \right| + \left| y_{ij}^{vt} - \frac{y_{ij}^{tl} + y_{ij}^{tr}}{2} \right| \quad (22)$$

$$d_{ij}^{c2} = \left| y_{ij}^{vs} - \frac{y_{ij}^{sl} + W_{lane}/2}{2} \right| + \left| y_{ij}^{vt} - \frac{y_{ij}^{tl} + W_{lane}/2}{2} \right|$$

$$d_{ij}^{c3} = \left| y_{ij}^{vs} - \frac{y_{ij}^{sr} - \frac{W_{lane}}{2}}{2} \right| + \left| y_{ij}^{vt} - \frac{y_{ij}^{ts} - \frac{W_{lane}}{2}}{2} \right|$$

where $$y_{ij}^{sl} = a_{0L} + a_{1L}x_{ij}^{vs} + a_{2L}(x_{ij}^{vs})^2 + a_{3L}(x_{ij}^{vs})^3 \quad (23)$$
$$y_{ij}^{tl} = a_{0L} + a_{1L}x_{ij}^{vt} + a_{2L}(x_{ij}^{vt})^2 + a_{3L}(x_{ij}^{vt})^3$$
$$y_{ij}^{sr} = a_{0R} + a_{1R}x_{ij}^{vs} + a_{2R}(x_{ij}^{vs})^2 + a_{3R}(x_{ij}^{vs})^3$$
$$y_{ij}^{tr} = a_{0R} + a_{1R}x_{ij}^{vt} + a_{2R}(x_{ij}^{vt})^2 + a_{3R}(x_{ij}^{vt})^3.$$

The term $D_{ij}^c$ in eq. (15) is included in the distance function so that the shortest path is forced to be sufficiently close to the center of the lane that the corresponding segment is closest to. This will result in a lane centering behavior when there is no target vehicle around or no threat posed to the host vehicle. As describe earlier, $D_{max}^c$ is used to normalize this cost to [0 1] range and $\alpha_c$ is a tuning parameter.

The term $D_{ij}^p$ in eq. (15) is included to ensure that the shortest path is at least at a safe distance from the surrounding obstacles such as other moving target vehicles or stationary objects. The component takes into consideration the dynamics of the moving targets when planning a collision-free path. Referring to eq. (15) scan points are shifted based on position of the corresponding segment vertices as follows:

$$\bar{x}_{kl}^{ij} = x_{kl}^s + V_k^t \cos(\theta_k^t) T_{v_{ij}}^r, \text{ for } k=1,2,\ldots,n$$

$$\bar{y}_{kl}^{ij} = y_{kl}^s + V_k^t \sin(\theta_k^t) T_{v_{ij}}^r, l=1,2,\ldots,m_k \quad (24)$$

where $(\bar{x}_{kl}^{ij}, \bar{y}_{kl}^{ij})$ is the shifted point of scan node $(x_{kl}^s, y_{kl}^s)$ for the j-th segment of the i-th path, and $T_{v_{ij}}^r$ denotes the time period the host vehicle needs to reach the maximum-X node of that segment, which is represented as follows:

$$T_{v_{ij}}^r = \frac{\max(x_{ij}^{vs}, x_{ij}^{vt}) - X_h}{V_h \cos(\theta_h)}. \quad (25)$$

The shifted scan points are then transformed to the segment's local frame as utilizing the following equations:

$$\hat{x}_{kl}^{ij} = [\bar{x}_{kl}^{ij} - \max(x_{ij}^{vs}, x_{ij}^{vt})] \cos(\theta_{ij}) + [\bar{y}_{kl}^{ij} - y_{ij}^{v\ \arg\max(x_{ij}^{vs}, x_{ij}^{vt})}] \sin(\theta_{ij})$$

$$\hat{y}_{kl}^{ij} = -[\bar{x}_{kl}^{ij} - \max(x_{ij}^{vs}, x_{ij}^{vt})] \sin(\theta_{ij}) + [\bar{y}_{kl}^{ij} - y_{ij}^{v\ \arg\max(x_{ij}^{vs}, x_{ij}^{vt})}] \cos(\theta_{ij}). \quad (26)$$

The virtual potential field value $D_{ij}^p$ of the j-th segment of the i-th path is then obtained from the following representation:

$$D_{ij}^p = \begin{cases} D_{ij}^p + 1 & \text{if } |\hat{x}_{kl}^{ij}| \leq d_{safe}^{lon} \ \& \ |\hat{y}_{kl}^{ij}| \leq d_{safe}^{lat} \\ D_{ij}^p & \text{otherwise} \end{cases} \quad (27)$$

for $k = 1, 2, \ldots, n, l = 1, 2, \ldots, m_k$ where $d_{safe}^{lon}$ and $d_{safe}^{lat}$ are the longitudinal and lateral safe distances from the obstacles, and $D_{max}^p$ is used to normalize the potential field to [0 1] range and $\alpha_p$ is the tuning parameter.

To ensure that the resulting path is at a safe distance from the obstacles, $\alpha_p$ is preferably chosen to have the highest value among all the weight coefficients in eq. (15). This provides the greatest emphasis on safety in determining the planned path for the maneuver. It should be understood that the weight coefficients may be proportioned other than what is described herein to accommodate a driving condition set forth by a manufacturer.

If the length of the segment is shorter than a threshold value, $L_{min}^{seg}$, or its relative slope to the current lane is larger than a threshold value, $S_{max}^{seg}$, then the segment heading, $\theta_{ij}$, in eq. (26) is replaced by the heading angle of the current lane. This is performed to ensure that any segments with short lengths and/or relatively large slopes do not cause non-real potential fields for the segment.

Figure 8:
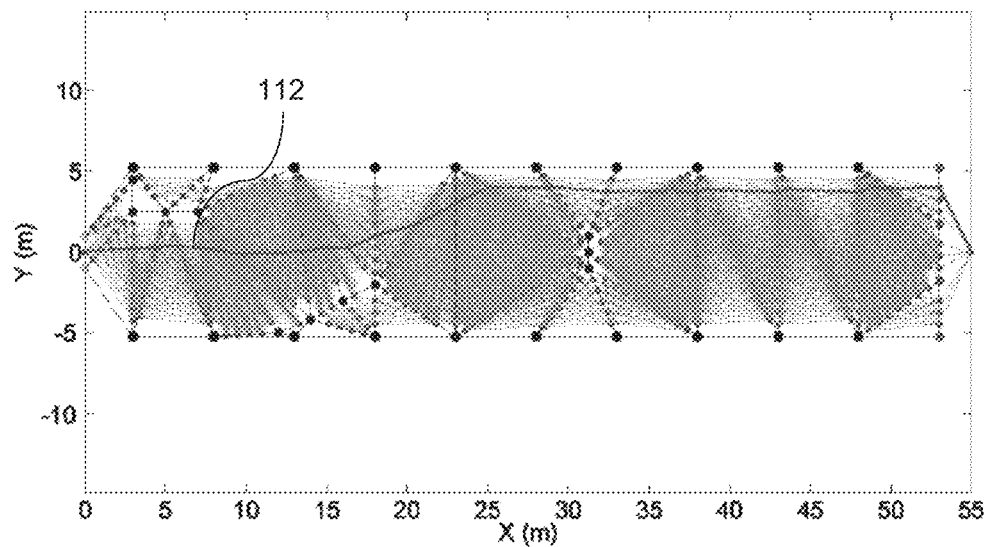
FIG. 8 is a generated planned path based.

A resulted shortest path 112 with the distance function in eq. (15) is shown in FIG. 8 for the sample scenario illustrated in FIG. 4. As shown in this example, the technique identifies the left lane as the shortest path since the target vehicle on the left lane is moving much slower than the host vehicle and is therefore the safest option. It should be understood that the planned path although possibly the shortest path, may not be the best path given possible vehicle dynamics of other vehicle or due to high lateral accelerations that are required between connecting linear segments. As a result, further analysis of the planned path and refinement of the planned path may be required.

In step 36, a determination is made whether the source vertex connects the target vertex utilizing the resulting path. If a determination is made that the planned path does not connect the respective vertices, then the routine proceeds to step 42 where the routine sets the path as not feasible. The routine returns to step 31 to re-plan a path. If the determination was made in step 36 that the resulting path connects the source vertex to the target vertex, then the routine proceeds to step 37.

In step 37, in response to determining the shortest path, a safe corridor is generated around the shortest path. The safe corridor is identified such that host vehicle path satisfies the following conditions while it is inside the corridor. The conditions are as follows: (1) the host vehicle path is fairly close to the shortest path; (2) the host vehicle path is at a safe distance from all surrounding objects; and (3) the host vehicle path stays on the road.

To find the safe corridor, the vertices $(x_{i*j}^v, y_{i*j}^v)$, j=1, 2, ..., $n_{sp}$ along the shortest path are utilized. In utilizing these parameters, left and right corridor points are calculated for each vertex. In addition, dynamics of the moving targets must be taken into consideration in the calculation. The scan points are first shifted as follows:

$$\bar{x}_{kl}^{i*j} = x_{kl}^s + V_k^t \cos(\theta_k^t) T_{v_{i*j}}^r, \text{ for } k=1,2,...,n$$

$$\bar{y}_{kl}^{i*j} = y_{kl}^s + V_k^t \sin(\theta_k^t) T_{v_{i*j}}^r, l=1,2,...,m_k \quad (28)$$

where $(\bar{x}_{kl}^{i*j}, \bar{y}_{kl}^{i*j})$ is the shifted point of scan node $(x_{kl}^s, y_{kl}^s)$ for the j-th segment of the shortest path, and $T_{v_{i*j}}^r$ denotes the time period the host vehicle needs to reach the vertex $(x_{i*j}^v, y_{i*j}^v)$. The time period $T_{v_{i*j}}^r$ is represented as follows:

$$T_{v_{i*j}}^r = \frac{x_{i*j}^v - X_h}{V_h \cos(\theta_h)}. \quad (29)$$

The shifted scan points are then transformed to the shortest path segment's local frame using the following formulas:

$$\hat{x}_{kl}^{i*j} = [\bar{x}_{kl}^{i*j} - x_{i*j}^v] \cos(\theta_{i*j}) + [\bar{y}_{kl}^{ij} - y_{i*j}^v] \sin(\theta_{i*j})$$

$$\hat{y}_{kl}^{i*j} = -[\bar{x}_{kl}^{i*j} - x_{i*j}^v] \sin(\theta_{i*j}) + [\bar{y}_{kl}^{ij} - y_{i*j}^v] \cos(\theta_{i*j}) \quad (30)$$

where $\theta_{i*j}$ is the slope of the segment connecting vertices $(x_{i*(j-1)}^v, y_{i*(j-1)}^v)$ to $(x_{i*j}^v, y_{i*j}^v)$.

The following minimum and maximum values of the transferred scan points are then determined utilizing the following conditions:

$$y_{min}^{i*j} = \min_{k,l}(\hat{y}_{kl}^{i*j}) \text{ for all } |\hat{x}_{kl}^{i*j}| \le L_h \& \hat{y}_{kl}^{i*j} > 0$$

$$y_{max}^{i*j} = \max_{k,l}(\hat{y}_{kl}^{i*j}) \text{ for all } |\hat{x}_{kl}^{i*j}| \le L_h \& \hat{y}_{kl}^{i*j} < 0. \quad (31)$$

The left and right corridor points for the corresponding shortest path vertex are calculated using the following conditions:

$$x_j^{lt} = 0 \quad (32)$$

$$y_j^{lt} = \begin{cases} \min(y_{min}^{i*j} - d_{safe}^{lat}, W_{cor}) & \text{if } y_{min}^{i*j} - d_{safe}^{lat} > 0 \\ y_{min}^{i*j} - d_{safe}^{lat} & \text{otherwise} \end{cases}$$

-continued $$x_j^{rt} = 0 \text{ for } j=1, 2, ..., n_{sp}$$

$$y_j^{rt} = \begin{cases} \max(y_{min}^{i*j} + d_{safe}^{lat}, -W_{cor}) & \text{if } y_{max}^{i*j} + d_{safe}^{lat} < 0 \\ y_{min}^{i*j} + d_{safe}^{lat} & \text{otherwise} \end{cases}$$

where $(x_j^{lt}, y_j^{lt})$ and $(x_j^{rt}, y_j^{rt})$ denote the j-th left and right corridor points in the segment's local frame.

The points in eq. (32) are then transformed back to the global frame to obtain $(x_j^{lt}, yY_j^{lt})$ and $(x_j^{rt}, y_j^{rt})$, j=1, 2, ..., $n_{sp}$. If the length of the segment is shorter than a threshold value, $L_{min}^{seg}$, or its relative slope to the current lane is larger than a threshold value, $S_{max}^{seg}$, then the segment heading, $\theta_{i*j}$, in eq. (30) is replaced by the heading angle of the current lane.

Figure 9:
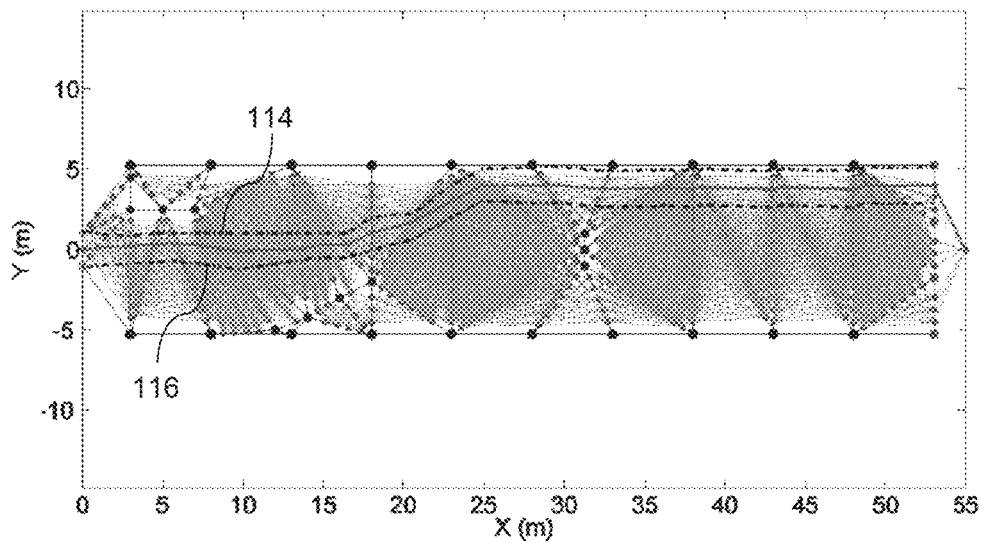
FIG. 9 is a planned path corridor.

FIG. 9 illustrates the respective safe corridor for the exemplary scenario. A first set of connected lines 114 for the left side corridor points represents a left boundary of the safe corridor, and a second set of connected lines 116 for the rights side corridor points represents a right boundary of the safe corridor.

In step 38, in response to identifying a safe corridor, the routine determines a path inside the corridor for the host vehicle which is smooth enough to be tracked. The dynamic constraints imposed by the host vehicle are the maximum lateral acceleration and lateral jerk on the path. This implies limits for a maximum curvature and curvature rate for a feasible host vehicle path. As a result, the technique refines the path points inside the corridor such that the final path is as close as possible to a path which can be tracked by the host vehicle and minimizes excessive curvatures in the planned path.

This step is described herein as a sub-routine. In step 38-1, equal-distance vertical lines in the global frame are determined in the range of the safe corridor and are represented as follows:

$$X = \bar{X}_i = X_h + d_L i, \text{ for } i=1,2,...,n_{HV} \quad (33)$$

where $d_L$ is a constant parameter representing the distance between the vertical lines.

In step 38-2, intersection points of the vertical lines in eq. (33) are determined with the left and right corridor lines. The resulting points are referred to as vertical corridor points. The left corridor points are represented by $p_i^{lt}:(\bar{X}_i, \bar{Y}_i^{lt})$ and the right corridor points are represented by $P_i^{rt}:(\bar{X}_i, \bar{Y}_i^{rt})$.

In step 38-3, path points ($P_i$) are defined as follows:

$$X_i^p = \bar{X}_i, Y_i^p = \bar{Y}_i^{rt} + \lambda_i(\bar{Y}_i^{lt} - \bar{Y}_i^{rt}) \text{ for } i=1,2,...,n_{HV} \quad (34)$$

where $\lambda_i \in [0,1]$ moves the path point $P_i$ along the vertical line inside the corridor.

In step 38-4, each of the path points are initially positioned at the middle point of the vertical line in between the vertical corridor points by setting $\lambda_i = 0.5$, for i=1, 2, ..., $n_{HV}$.

In step 38-5, for the path point $P_i$, a cost function is defined as follows:

$$F_i = w_1 C_i^2 + w_2 (\Delta C_i)^2 \quad (35)$$

where $C_i$ and $\Delta C_i$ denote the estimated curvature and curvature rate at $P_i$, respectively, $$C_i = \frac{2\sin(\angle P_{i-1} P_i P_{i+1})}{|P_{i-1} - P_{i+1}|}, \Delta C_i = \frac{C_i - C_{i-1}}{|P_i - P_{i-1}|}. \quad (36)$$

The sin( ) function in eq. (32) is calculated using the cross product formula as:

$$\sin(\angle P_{i-1} P_i P_{i+1}) = \frac{|\overrightarrow{P_i P_{i+1}} \times \overrightarrow{P_i P_{i-1}}|}{|P_i - P_{i+1}| \times |P_i - P_{i-1}|} \quad (37)$$

In step 38-6, an assumption is made that $|P_i-P_{i+1}|$ and $|P_i-P_{i-1}|$ are constant values, and the curvature and curvature rate are linear function of $\lambda_i$. Therefore, the cost function $F_i$ will be a quadratic function of $\lambda_i$. A minimum point of the cost function $\bar{\lambda}_i = \min_{\lambda_i}(F_i)$ is found by solving for $\partial F_i/\partial \lambda_i = 0$.

In step 38-7, path point $P_i$ is updated based on the following criteria:

$$Y_i^p = \begin{cases} \bar{Y}_i^{rt} + \bar{\lambda}_i(\bar{Y}_i^{lt} - \bar{Y}_i^{rt}) & \text{if } \bar{\lambda}_i \in [0, 1] \\ \bar{Y}_i^{rt} & \text{if } \bar{\lambda}_i < 0 \\ \bar{Y}_i^{lt} & \text{if } \bar{\lambda}_i > 1 \end{cases} \quad (38)$$

In step 38-8, steps 38-5 to 38-7 are repeated until all path $P_i$, i=1, 2, ..., $n_{HV}$ are updated once.

In step 38-9, the return repeats steps 38-5 to 38-8 for a maximum number of iterations $N_{itr}$ until the curvature and curvature rate at all path points are less than predetermined threshold rate values. If the maximum curvature and curvature rate exceed their respective predetermined threshold rates after $N_{itr}$ iterations, then the routine is stopped thereby implying that a feasible host vehicle path cannot be found.

Figure 10:
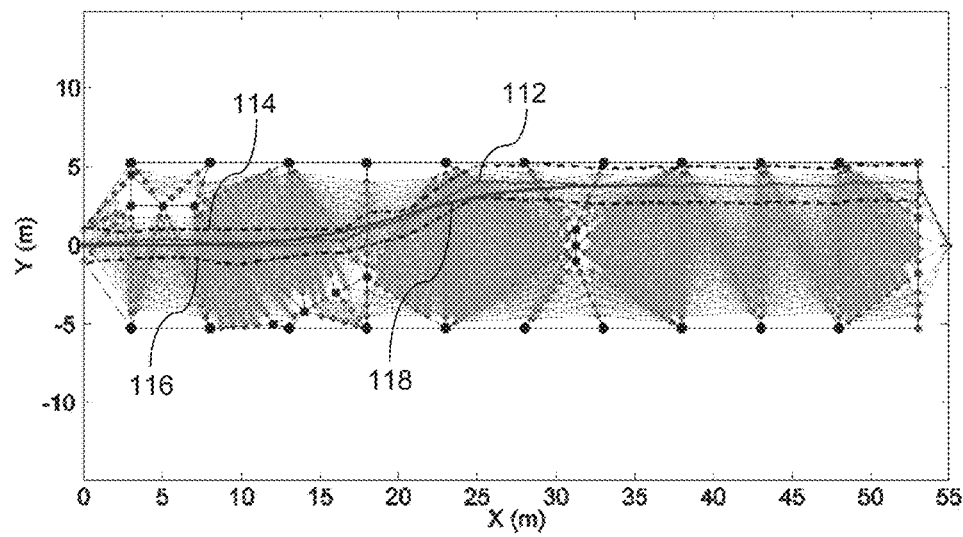
FIG. 10 is a re-generated planned path within the planned path corridor.

The path resulting from applying this technique to the safe corridor in FIG. 9 is shown in FIG. 10 where line 118 represents the smoothed host vehicle planned path. It should be understood that there is a limit on the maximum number of waypoints considered for the host vehicle path. Therefore, the host vehicle path may not cover the whole path planning range as shown in FIG. 10.

In step 39, in response to obtaining the host vehicle path determined in step 38, a verification is made utilizing two conditions to ensure that the resulted path is feasible. First, the maximum lateral acceleration at the host vehicle path waypoints must be less than predetermined threshold acceleration values. A lateral acceleration can be estimated utilizing the following equation:

$$a_i^{lat} = V_h^2 C_i, i=1,2,\ldots,n_{HV} \quad (39)$$

where $C_i$ is the estimated curvature value calculated in eq. (36).

A second condition is that the host vehicle path must be at a safe distance from all surrounding obstacles. To verify this condition, scan points are first shifted and transformed to the host vehicle path segment's local frame using eq. (28)-(30) where the shortest path vertices are replaced by host vehicle waypoints. The following condition is then checked for all host vehicle path waypoints to ensure that the host vehicle path is sufficiently far from any target vehicles or other obstacles. The condition is represented as follows:

$$|\hat{x}_{kl}^{pi}| L_h \& |\hat{y}_{kl}^{pi}| > W_h/2 \quad (40)$$

for k=1, 2, ..., n, l=1, 2, ..., $m_k$, i=1, 2, ..., $n_{HV}$

In step 40, a decision is made as to whether the path re-generated planned path is feasible. If the determination is made that the path is not feasible based on the feasibility analysis performed in step 40, then routine proceeds to step 31. If the determination is made that the path is feasible, then the routine proceeds to step 41.

In step 41, the host vehicle planned path that is determined as being feasible is sent to the controller where the controller executes the planned path autonomously. In response to implementing the planned path, a return is made to step 31.

In step 31, a check is made whether a time since the last path was planned has expired. As described earlier, a planned path is generated at the end of each cycle time $T_{plan}$. $T_{plan}$ represents a first predetermined rate of time that the routine waits until a next path is planned. As a result, the system will await a duration of time equal to $T_{plan}$ (unless a return is made indicating existing path is unsafe or not feasible), and then generate a next planned path after the duration of time equal to $T_{plan}$ as expired. For example, $T_{plan}$ may be duration of time set to 0.5 sec. As a result, the processor will plan a new path every 0.5 sec. It should be understood that the duration of time 0.5 sec is exemplary and that times other than 0.5 sec may be utilized. Therefore, when the routine loops from step 42 to 32, a determination is made as to whether $T_{plan}$ (e.g., 0.5 sec) has elapsed. If the determination is made that $T_{plan}$ has not elapsed and that there are no safety or feasibility concerns with the existing planned path, then the routine proceeds to step 42.

In step 42, object map data is obtained from the sensing devices and imaging device to perform a safety check. The safety check is performed at a second predetermined rate of time $T_s$ (e.g., 10 msec). It should be understood that the 10 msec is exemplary and that other rates of times may be used. It should further be understood that the safety check does not determine or generate a next planned path; rather, the safety check repetitiously checks the safety of the current path in between the planned path times to verify no new threads are introduced to the last planned path. As a result, a plurality of safety checks is repetitiously performed based on new sensor and imaging data obtained in between path planning stages.

In step 43, the safety of the current path is analyzed by monitor incoming sensor data and determining whether the current planned path is safe. During the safety check, the most recent host vehicle planned path found to be feasible will remain unchanged over a period of time $T_{plan}$ before the path is replanned based on the new sensor data. This is done to reduce the computational cost to achieve a fast RPP planning process in practical real-time implementations on the vehicle. Although $T_{plan}$ is set to be short enough to assume that the road scenario does not change significantly during that period, the additional safety check is performed for every $T_s$ to ensure that the existing planned path vehicle path is safe between the planning time periods.

To check the safety of the current planned path, all the host vehicle path waypoints are transformed to each moving target local frame as represented by the following expressions:

$$x_i^{pj} = [X_i^p - X_j^t] \cos(\theta_j^t) + [Y_i^p - Y_j^t] \sin(\theta_j^t) \text{ for } i=1, 2,\ldots,n_{HV}$$

$$y_i^{pj} = -[X_i^p - X_j^t] \sin(\theta_j^t) + [Y_i^p - Y_j^t] \cos(\theta_j^t) j=1, 2,\ldots,n. \quad (41)$$

Figure 11:
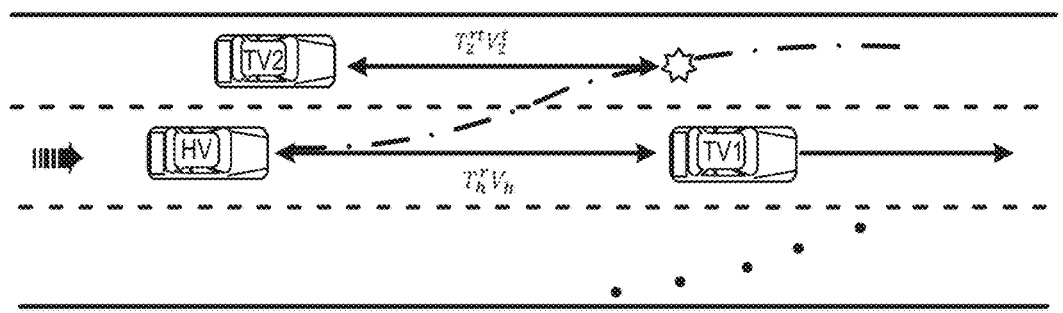
FIG. 11 is a safety check illustration of the host vehicle planned path in between planning times.

A region ahead of each moving target is defined and the minimum-X waypoint inside that region (if existed) is identified as shown in FIG. 11. This is represented as follows:

$$i_j^* = \underset{i}{\mathrm{argmin}}(x_i^{pj}) \text{ for all } x_i^{pj} > 0 \ \& \ |y_i^{pj}| \le W_h \qquad (42)$$

Time intervals for the moving target $T_j^{rt}$, and the host vehicle $T_h^r$, to reach this minimum point is then determined by the following representations:

$$T_j^{rt} = \frac{X_{i_j^*}^p - X_j^t}{V_j^t \cos(\theta_j^t)} \qquad (43)$$

$$T_h^r = \frac{X_{i_j^*}^p - X_h}{V_h \cos(\theta_h)}$$

The existing host vehicle path is considered safe if the following condition is satisfied for all the moving targets:

$$|T_j^{rt} - T_h^r| > \frac{d_{safe}^{lon}}{V_h}, \text{ for } j = 1, 2, \ldots, n. \qquad (44)$$

In step 44, a determination is made whether the existing planned path is still safe. If the determination is made that the existing planned path is still safe, then the routine proceeds to step 45.

In step 45, a host vehicle offset is determined and this information is provided to the controller in step 41. The routine returns to step 31 where the routine performs another safety check if $T_{plan}$ has not expired. If the determination is made that $T_{plan}$ is expired, then the routine proceeds to step 32 to plan a next path.

Referring again to step 44, if the determination is made that the existing path is not safe, then a return is made to step 31. In step 31, a flag is raised relating to the safety of the existing path, and the routine immediately proceeds to step 32 to recalculate a next planned path based on newly obtained object map data regardless of the whether the $T_{plan}$ is expired. In response a determination of new planned path, $T_{plan}$ is reset and the time period for next planned path determination is set at the expiration of $T_{plan}$.

While certain embodiments of the present invention have been described in detail, those familiar with the art to which this invention relates will recognize various alternative designs and embodiments for practicing the invention as defined by the following claims.

What is claimed is:

1. A method of adaptively re-generating a planned path for an autonomous driving maneuver comprising the steps of:
   (a) obtaining, by vehicle-based devices, object data associated with sensed objects in a road of travel;
   (b) constructing, by a processor, an object map based on the sensed objects in the road of travel;
   (c) re-setting and actuating a timer;
   (d) generating, by the processor, a planned path for autonomously maneuvering a vehicle around the sensed objects, the planned path being generated based on a cost-distance function;
   (e) autonomously maneuvering the vehicle along the planned path;
   (f) updating the object map based on updated sensed data from the vehicle-based devices;
   (g) determining whether the planned path is feasible based on the updated object map;
   (h) returning to step (a) in response to a determination that the planned path is infeasible; otherwise continuing to step (i);
   (i) determining whether the timer has expired; and
   (j) returning to step (a) in response to the timer expiring; otherwise, returning to step (f);
   wherein generating the planned path further includes the steps of identifying virtual nodes based on the sensed objects in the road of travel and applying Delaunay triangulation for generating triangles among selected virtual nodes;
   wherein the virtual nodes include lane virtual nodes, host vehicle virtual nodes, ending virtual nodes, and shifted scan nodes, the lane virtual nodes represent lane boundaries of the road, the host vehicle virtual nodes represent a position of a host vehicle and a start of a search space, wherein the ending virtual nodes represent an end of the search space, and the shifted scan nodes represent displacements of detected dynamic objects based on velocities of the detected dynamic objects relative to the host vehicle;
   wherein generating the planned path further includes identifying vertex points along edges of the triangles, the vertex points evenly spaced along each triangle edge, and forming linear segments between every pair of vertex points within each triangle;
   wherein a respective linear segment connecting a respective pair of vertex points is only formed if the respective pair of vertex points belongs to a respective triangle and if the vertex points do not belong to a same edge of the respective triangle;
   wherein the planned path is generated from an identified host virtual node to an identified ending virtual node by selecting a respective linear segment from each triangle, each linear segment selected from each triangle forms a continuous planned path from the identified host virtual node to the identified ending virtual node;
   wherein each of the selected linear segments are identified based on a cost-distance function, the cost-distance function being generated as distance functional components relating to a length of the planned path, as a relative slope of each segment, as an offset of the planned path to a previous determined path, as an offset from a center of a current driven lane, and as an offset distance from surrounding obstacles.

2. The method of claim 1, wherein no vertex points are formed on a lane boundary of the road.

3. The method of claim 1, wherein each of the respective distance functional components are weighted for identifying a degree of use in the cost-distance function.

4. The method of claim 3, wherein the cost-distance function is represented by the following formula:

$$D_i = \sum_j \left( \alpha_L \frac{D_{ij}^L}{D_{max}^L} + \alpha_s \frac{D_{ij}^s}{D_{max}^s} + \alpha_d \frac{D_{ij}^d}{D_{max}^d} + \alpha_c \frac{D_{ij}^c}{D_{max}^c} + \alpha_p \frac{D_{ij}^p}{D_{max}^p} \right),$$

for $i = 1, 2, \ldots, n_{path}, \quad j = 1, 2, \ldots, n_{seg}$ where $D_i$ is a distance for an i-th path from a source vertex to a target vertex, $D_{ij}^L$, $D_{ij}^s$, $D_{ij}^d$, $D_{ij}^c$, and $D_{ij}^p$ are distance function components of a j-th segment for the i-th path, $\alpha_L$, $\alpha_s$, $\alpha_d$ and $\alpha_p$ are constant weight coefficients, and area $n_{path}$ and $n_{seg}$ number of paths from the source vertex to target vertex and a number of linear segments in each path, respectively.

5. The method of claim 4, wherein the distance function component $D_{ij}^L$ corresponds to an actual length of the j-th segment of the i-th path, and wherein $D_{ij}^L$ is represented by the following equation:

$$D_{ij}^L = \sqrt{(x_{ij}^{vs} - x_{ij}^{vt})^2 + (y_{ij}^{vs} - y_{ij}^{vt})^2}$$

where $(x_{ij}^{vs}, y_{ij}^{vs})$ and $(x_{ij}^{vt}, y_{ij}^{vt})$ denote the source and target vertices of a corresponding segment, respectively.

6. The method of claim 5, wherein the distance function component $D_{ij}^s$ corresponds to the relative slope of the j-th segment of the i-th path to a heading of the host vehicle or the lane, wherein term $D_{ij}^s$ is represented as follows:

$$D_{ij}^s = \begin{cases} |\theta_{ij} - \theta_h| & \text{if } \min(x_{ij}^{vs}, x_{ij}^{vt}) - X_h \le D_{HV} \\ \gamma_s |\theta_{ij} - \theta_{lane}| & \text{otherwise} \end{cases}$$

where $\theta_{ij}$ is an angle of the linear segment in a global frame, $D_{HV}$ is a positive constant representing a close distance ahead of the host vehicle, $\gamma_s \in [0\ 1]$ is a tuning parameter, and $\theta_{lane}$ is the lane heading at a position of the linear segment.

7. The method of claim 4, wherein the distance function component $D_{ij}^s$ corresponds to the relative slope of the j-th segment of the i-th path to a heading of the host vehicle or the lane, wherein term $D_{ij}^s$ is represented as follows:

$$D_{ij}^s = \begin{cases} |\theta_{ij} - \theta_h| & \text{if } \min(x_{ij}^{vs}, x_{ij}^{vt}) - X_h \le D_{HV} \\ \gamma_s |\theta_{ij} - \theta_{lane}| & \text{otherwise} \end{cases}$$

where $\theta_{ij}$ is an angle of the linear segment in a global frame, $D_{HV}$ is a positive constant representing a close distance ahead of the host vehicle, $\gamma_s \in [0\ 1]$ is a tuning parameter, and $\theta_{lane}$ is the lane heading at the linear segment's position.

8. The method of claim 4, wherein the distance function component $D_{ij}^d$ corresponds to a distance of a segment in a search graph to a host vehicle path found at a previous planning time for preventing significant deviation from the previous planned path, wherein the distance function component $D_{ij}^d$ is represented as follows:

$$D_{ij}^d = D_{ij}^{ds} + D_{ij}^{dt}$$

where $D_{ij}^{ds}$ and $D_{ij}^{dt}$ are weighted offsets from a previous host vehicle path for the source and target vertices of the segments with weighting directed on vertices closer to the host vehicle.

9. The method of claim 4, wherein the distance function component $D_{ij}^{lc}$ corresponds to a distance of a segment in a search graph to a centerline of a current lane, wherein the distance function component $D_{ij}^c$ is represented as follows:

$$D_{ij}^c = \min(d_{ij}^{c1}, d_{ij}^{c2}, d_{ij}^{c3})$$

where $d_{ij}^{c1}$, $d_{ij}^{c2}$ and $d_{ij}^{c3}$ are offset values of each linear segment from the centers of a current lane, an adjacent left lane, and an adjacent right lane, respectively.

10. The method of claim 9, wherein the distance component function $D_{ij}^p$ ensures that the shortest planned path is at least at a safe distance threshold from the surrounding obstacles while factoring dynamics of moving targets, and wherein a virtual potential field value $D_{ij}^p$ is represented as follows:

$$D_{ij}^p = \begin{cases} D_{ij}^p + 1 & \text{if } |\hat{x}_{kl}^{ij}| \le d_{safe}^{lon} \ \& \ |\hat{y}_{kl}^{ij}| \le d_{safe}^{lat} \\ D_{ij}^p & \text{otherwise} \end{cases}$$

for $k = 1, 2, \ldots, n, \quad l = 1, 2, \ldots, m_k$ where $d_{safe}^{lon}$ and $d_{safe}^{lat}$ are a longitudinal safe distance and a lateral safe distance, respectively, from the surrounding obstacles.

11. The method of claim 1, further comprising the step of refining the planned path by identifying a corridor surrounding the planned path, the corridor having a left corridor boundary and a right corridor boundary offset from the planned path.

12. The method of claim 11, wherein the left corridor boundary and the right corridor boundary are formed based on left corridor points and right corridor points wherein the left corridor points and right corridor points are determined using the following conditions:

$$x_j^{lt} = 0$$

$$y_j^{lt} = \begin{cases} \min(y_{min}^{i*j} - d_{safe}^{lat}, W_{cor}) & \text{if } y_{min}^{i*j} - d_{safe}^{lat} > 0 \\ y_{min}^{i*j} - d_{safe}^{lat} & \text{otherwise} \end{cases}$$

$$x_j^{rt} = 0 \quad \text{for } j = 1, 2, \ldots, n_{sp}$$

$$y_j^{rt} = \begin{cases} \max(y_{min}^{i*j} + d_{safe}^{lat}, -W_{cor}) & \text{if } y_{max}^{i*j} + d_{safe}^{lat} < 0 \\ y_{min}^{i*j} + d_{safe}^{lat} & \text{otherwise} \end{cases}$$

where $(x_j^{lt}, y_j^{lt})$ and $(x_j^{rt}, y_j^{rt})$ denote the j-th left and right corridor points in a local frame of a respective segment.

13. The method of claim 11, further comprising the step of re-generating a planned path within the corridor as a function of an estimated curvature and curvature rate at various path points.

14. The method of claim 13, further comprising the step of determining feasibility of the re-generated planned path as a function of lateral accelerations of the vehicle and a distance from surrounding objects.

* * * * *